(No Model.)
L. G. HUNTINGTON.
SWITCH AND SIGNAL LANTERN.
No. 280,624. Patented July 3, 1883.
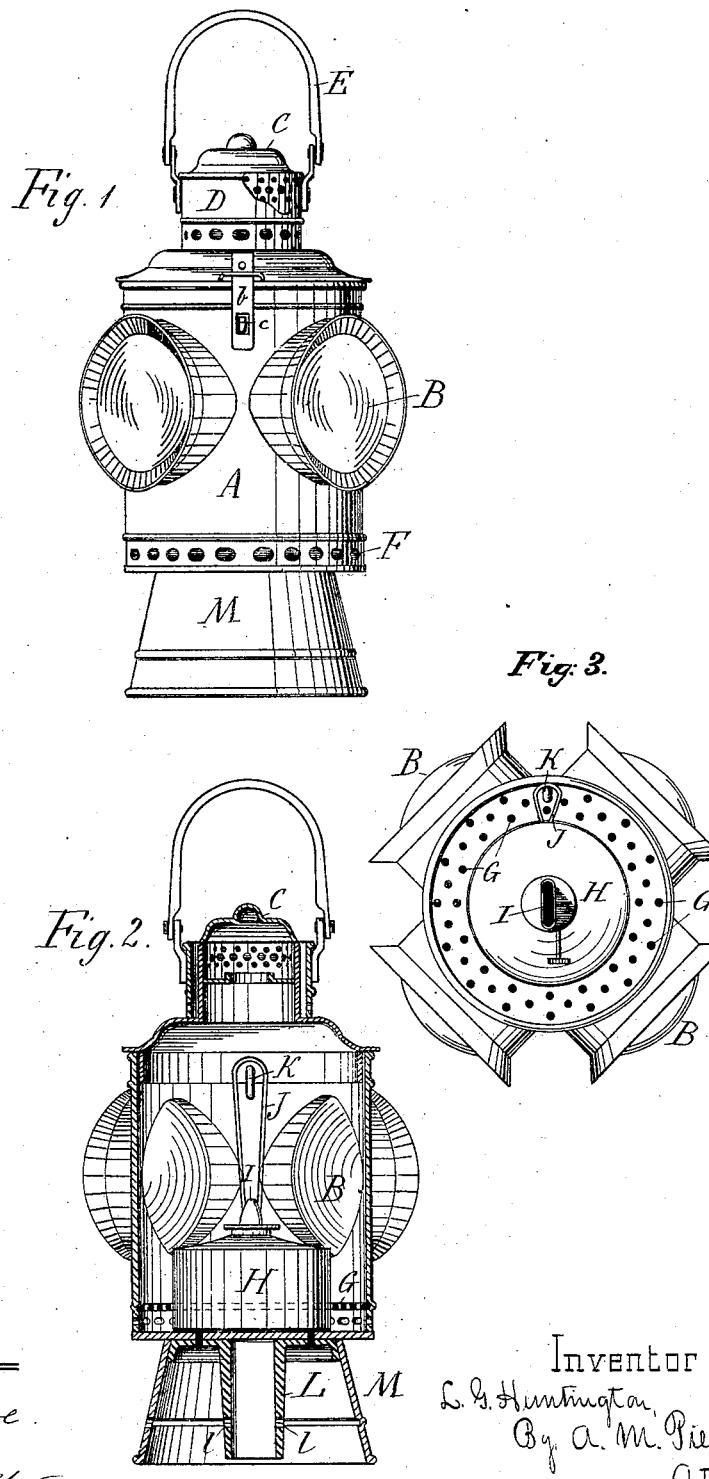
Witnesses —
Wm. A. Lowe
John Buckler
Inventor —
L. G. Huntington,
By A. M. Pierce,
Atty.

UNITED STATES PATENT OFFICE.

LAWSON G. HUNTINGTON, OF NEW YORK, N. Y.

SWITCH AND SIGNAL LANTERN.

SPECIFICATION forming part of Letters Patent No. 280,624, dated July 3, 1883.

Application filed May 4, 1883. (No model.)

*To all whom it may concern:*

Be it known that I, LAWSON G. HUNTINGTON, of the city, county, and State of New York, have invented certain new and useful Improvements in Switch and Signal Lanterns, of which the following is a full, clear, and exact description, reference being had to the accompanying drawings, and to the letters of reference marked thereon.

My invention relates especially to that class of lamps used for railroad-switch and other signaling purposes, and has for its object the production of a device which is effective and simple, embodying all the necessary elements to render it particularly applicable to the purposes for which it is intended.

The invention consists, essentially, in the combination, in a signal-lamp, of a body bearing lenses and having a hinged top, as fully described by me in Letters Patent No. 251,781, dated January 3, 1882, and of an oil-pot held in place by a perforated plate located in the lamp-body, said oil-pot being provided with a handle for lifting it from the inclosing-case; also, in the combination, in a signal-lamp, with a body bearing lenses and provided with a hinged top, of a perforated plate holding the oil-pot in a central position, and a cast-metal socket secured to the bottom of the lamp-case, and a support for holding the lamp in an upright position when resting upon the ground.

My invention further consists in the combination, in a signal-lamp, of a casing or body bearing lenses, a hinged top whereon is located a bail or handle, a removable oil-pot having a handle attached to one side thereof, a perforated plate, through which the air passes to support combustion, located near the bottom of the casing, and a hood or support fixed to the bottom of the casing, a supporting-socket adapted and arranged to engage with a switch-shaft, being located within the hood and secured to the bottom of the casing beneath the oil-pot.

In the drawings, Figure 1 is a view in elevation of my improved switch and signal lamp; and Fig. 2 is a vertical sectional view thereof, showing the location and arrangement of all the parts. Fig. 3 is a plan view of the lamp with the top removed.

Like letters of reference, wherever they occur, indicate corresponding parts in all the figures.

A is the body of the lamp, constructed in the usual manner, and bearing lenses B. The top is provided with a perforated dome, C, around which is supported an outer casing, D, wherein is secured the bail E. The top is hinged to the body and provided with a spring-catch, *b*, and button *c*, as fully described in my above mentioned Letters Patent No. 251,781. Casing or body A is perforated near the bottom for the admission of air. Secured to the inner wall of the casing is a perforated plate, G, regulating the passage of air to support combustion, and forming a seat for the oil-pot H, keeping the same at all times centrally located within the casing. The oil-pot is provided with a burner, I, and a curved or bent handle, J, extending upward within the casing and held against lateral movement by a stud or staple, K, affixed to the wall A. The oil-pot may be removed at the top of the casing by its handle, and the perforated plate G holds it in place.

L is a cast-metal socket-plate, riveted or otherwise secured to the bottom of casing A beneath the oil-pot. The socket in the plate is designed to engage with a switch-shaft, and a pin may be inserted through the perforations *l l* for securing the lamp against displacement.

M is a hood attached to the bottom of casing A, surrounding socket-plate L. This hood is intended to support the device when removed from the shaft; but, if desired, legs or other suitable supporting mechanism might be substituted therefor.

Having now fully described my invention, what I claim as new therein, and desire to secure by Letters Patent, is—

1. In a signal and switch lamp, the combination, with a body bearing lenses, and having a hinged top, as set forth, of an oil-pot held in place by a perforated plate located within the lamp body or casing, said oil-pot being provided with an upwardly-projecting handle, substantially as and for the uses and purposes shown and described.

2. The combination, in a signal or switch lamp, with the body bearing lenses, of a perforated plate holding the oil-pot in a central position, and a cast-metal socket secured to the bottom of the lamp-casing, and a support adapted and arranged to hold the lamp in an upright position when removed from the switch-shaft, substantially as shown and described.

3. The combination, in a signal or switch lamp, of a body or casing bearing lenses, a hinged top whereon is located a bail or handle, a removable oil-pot having a handle attached to one side thereof, a perforated plate through which air passes to support combustion, said plate being located near the bottom of the casing, as set forth, and a hood or support affixed to the bottom of the casing, a socket-plate adapted and arranged to engage with a switch-shaft, being located within the hood, substantially as shown and described.

In testimony that I claim the foregoing I have hereunto set my hand in the presence of two witnesses.

LAWSON G. HUNTINGTON.

Witnesses:
A. M. PIERCE,
WM. A. LOWE.